United States Patent [19]

Hans

[11] Patent Number: 4,965,939
[45] Date of Patent: Oct. 30, 1990

[54] PROGRAMMING HANDLE

[75] Inventor: Richter Hans, Augsburg, Fed. Rep. of Germany

[73] Assignee: Blomberg Robotertechnik GmbH, Ahlen, Fed. Rep. of Germany

[21] Appl. No.: 360,095

[22] Filed: Jun. 1, 1989

[30] Foreign Application Priority Data

Jun. 11, 1988 [EP] European Pat. Off. ........ 88109325.6

[51] Int. Cl.⁵ .............................................. G01B 7/28
[52] U.S. Cl. ...................................... 33/558; 33/561; 33/503
[58] Field of Search ................. 33/501, 502, 503, 504, 33/556, 557, 558, 559, 560, 561

[56] References Cited

U.S. PATENT DOCUMENTS 3,990,153 11/1976 Calame ............................ 33/503 X
4,536,961 8/1985 Degoumois ........................... 33/558

Primary Examiner—Harry N. Haroian
Attorney, Agent, or Firm—Pascal & Associates

[57] ABSTRACT

A programming device for providing a signal relating to movement of a movable device. An inner part is connected to the part of the device to be programmed. A casing, which is controlled by the programmer's hand, surrounds the inner part. Measuring systems, which measure relative movements between the casing and the inner part resulting from moving the casing are placed between the inner part and the casing. These measuring systems consist of a sliding carriage moving linearly on the inner part and a ball located between two pins which are connected to the casing. The pins are surrounded by springs which are fixed, on one hand, to the casing and, on the other hand, to arms of the carriage guide. Movements of the sliding carriage relative to the inner part are measured.

13 Claims, 2 Drawing Sheets

PROGRAMMING HANDLE

This invention relates to a programming device for providing a signal related to movement of a movable device.

A programming device of the type to which the present invention is directed is described in patent document CH-A No. 639 310. According to a first embodiment described in the aforenoted document, springs in the form of tongues have wire strain guage sensors are located thereon. According to a second embodiment, springs in the form of leaf springs are each disposed between two inductive pick-up sensors. The leaf springs are fixed at their inner parts and have a ball on each of their ends against each of which two stops of a casing abut. A disadvantage of both embodiments is that the springs are deformed in a curved manner, and as a result, the sensors measure curved deformations. A further disadvantage is that, because of movement of the springs in various axial directions, measurements which have not been accurately rectified are obtained. It is also a disadvantage that the forces which must be exerted on the casing in order to deform the springs to a specific degree, are predetermined by the elastic qualities of the springs. It is, however, desirable to vary these forces according to whether the load which moves the part of an apparatus to be programmed is light or heavy.

It is an object of the present invention to improve the programming device in such a way that undistorted measurements are obtained with respect to the relative movements between casing and the inner parts in various axial directions.

This and other objects are attained in accordance with an embodiment of the present invention which is a programming device for detecting movements Of a movable apparatus having an inner part which is rigidly connected to a part of the movable apparatus whose movements are to be programmed. A casing surrounds the inner part, and springs are disposed between the inner part and the casing, the springs enabling relative movements between the inner part and the casing corresponding to directions to be programmed. Sensors measure the relative movements and convert them into electrical signals. A sliding carriage is connected to the casing, the sliding carriage being mounted on the inner part in such manner that it can be linearly moved in an axial direction at right angles to the longitudinal axis. One coil spring which can be compressed in the axial direction of the inner part is located on each side of the sliding carriage between the casing and inner part, and an apparatus for measuring relative movement is located between the sliding carriage and the inner part.

An embodiment of the invention is described in greater detail below, with reference to the drawings, in which.

The programming device has an inner part 1 which can be rigidly connected via a connection plate 21 with the part of the handling apparatus to be programmed. This inner part 1 is surrounded by a casing 2 which has a square cross-section. The inner part 1 has a longitudinal axis 17.

With the programming device according to this embodiment of the invention, relative movements between the inner part 1 and casing 2 can be programmed in direction of axes X, Y and Z as well as rotary movements dx, dy and dz about the same axes, whereby axes X and Y extend at right angles to one another and to the Z axis, the latter axis being identical to the longitudinal axis 17 of the inner part 1.

Figure 1:
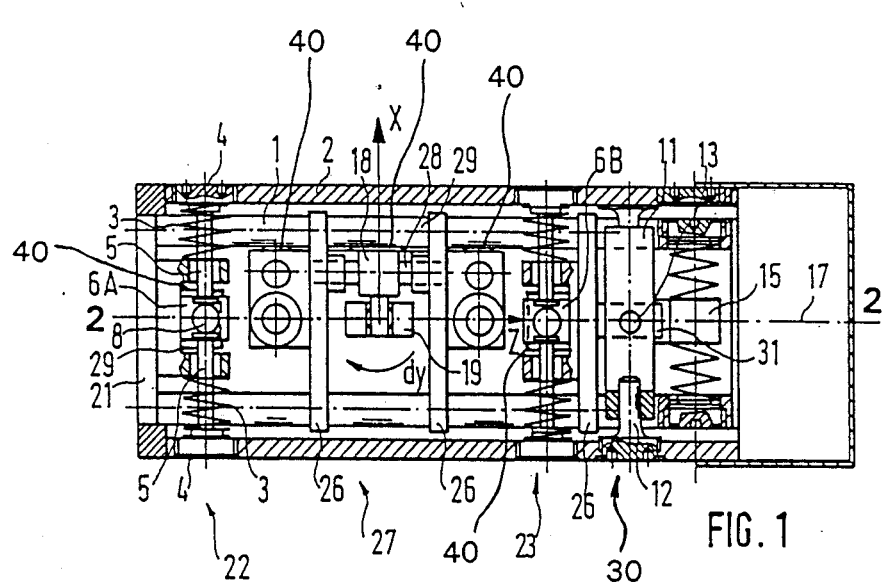
FIG. 1 is a longitudinal section through the programming device of the present invention along the line I—I in FIG. 2.
Figure 2:
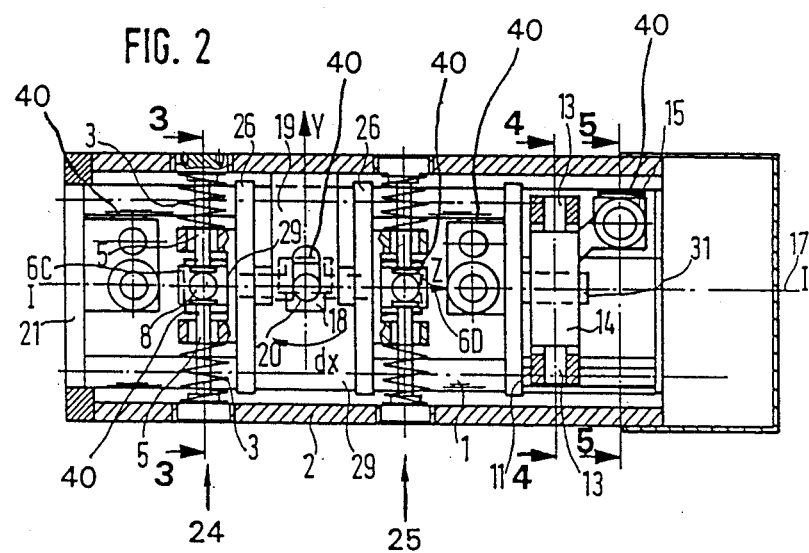
FIG. 2 is a longitudinal section through the programming device along the line II—II in FIG. 1.
Figure 3:
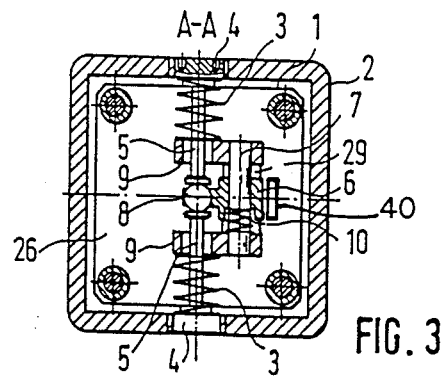
FIG. 3 is a cross-section along the line A—A in FIG. 2.
Figure 4:
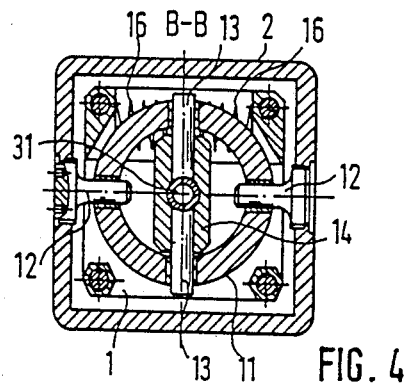
FIG. 4 is a cross-section along the line B—B in FIG. 2.
Figure 5:
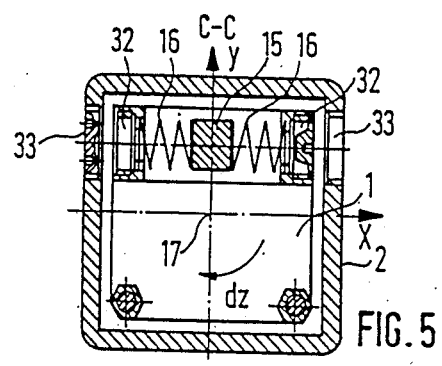
FIG. 5 is a cross-section along the line C—C in FIG. 2.

Measuring systems 22 and 23, which are placed along axis 17 spaced from one another, are used to program movements in the direction of axis X and to program rotary movements dy. For programming movements in the direction of axis Y and rotary movements dx, measuring systems 24 and 25 are used which are also placed along axis 17, spaced from one another. Measuring systems 24 and 25 are staggered and are rotated by 90° about axis 17 relative to measuring systems 22 and 23. Measuring systems 22-25 are identical to one another and their design is explained below with reference to FIG. 3.

Casing 2 surrounds the inner part 1 with play between them. Two legs 9 of a carriage seat, between which a shaft 7 extends, are located on a plate 26 which is part of the inner part which extends diagonally to axis 17. A sliding carriage 6 is mounted on shaft 7 in such a way that it can be moved. Inserts 4 are screwed into opposite walls of casing 2, the inserts 4 each having a pin 5 which extend in the direction of the longitudinal axis 17. The ends of the pins 5 have planar surfaces, between which a ball 8 of the sliding carriage 6 is placed so as to be as free from play as possible. Since absolute freedom from play cannot be attained, a spring 10 is placed over shaft 7, spring 10 being retained, on the one hand, on sliding carriage 6 and, on the other hand, on one of the legs 9. Pins 5 are surrounded by coil springs 3, which are retained, on one hand, on casing 2 and, on the hand, on legs 9. If pressure is exerted against casing 2 in the direction of arrow Y or in the opposite direction of this arrow, then sliding carriage 6 is linearly shifted over pins 5. A sensor 40 is located on plate 26; this sensor measures the relative motion between sliding carriage 6 and plate 26 and converts it into electrical signals. Sensors are shown generally as 40.

Legs 9 of the carriage seat have bores through which pins 5 extend. Since the inserts 4 can be unscrewed, it is possible to replace the coil springs 3 by springs which have a steeper or a flatter elastic quality.

With relative movements between inner part 1 and casing 2 in the direction of axis X, sliding carriages 6A and 6B of measuring systems 22 and 23 are shifted in the same direction. With rotary movements dy about axis Y, sliding carriages 6A and 6B are moved in the opposite direction. The same is true for sliding carriages 6C and 6D with a linear movement in direction of axis Y and/or with a linear rotary movement dx about axis X. The movements of the sliding carriages 6A to 6D are sensed in each case by the above mentioned sensors.

A further measuring system 27 is disposed between measuring systems 24 and 25 and is used for detecting relative movements between casing 2 and inner part 1 in the direction of axis Z. This measuring system 27 is comprised of a fork 19 which is fastened to casing 2.

This fork 19 extends inwardly up to longitudinal axis 17. Fork 19 is comprised of a ball 20 of a sliding carriage 18 which is mounted on a shaft 28 extending parallel to the longitudinal axis 17 and which extends between plates 26. If relative movement takes place between the inner part 1 and casing 2 in the direction of arrow Z of in a direction opposite to the direction of this arrow, then sliding carriage 18 is moved linearly. A sensor 40 is, in turn, located on plate 29, which detects the movement of sliding carriage 18 relative to plate 29.

The carriage seats are designed to be U-shaped in each case and have a flat centre leg 29 over which a flat side of sliding carriage 6 always slides, so that sliding carriages 6 are mounted on shafts 7 in such a way as to be resistant to twisting. This is also true in regard to the flat side of sliding carriage 18 with respect to plate 29.

In normal position, when no forces are being exerted against casing 2, all balls 8, 20 are located on the longitudinal axis 17.

Another measuring system 30 is provided for measuring rotary movements dz and axis Z. This measuring system has a gimbal ring 11 surrounding axis 7; gimbal ring 11 is held by two first hinge pins 12 which are fastened to two diametrically opposite walls of casing 2. These hinge pins 12 extend coaxially to one another. The gimbal ring 11 is supported by hinge pins 12 in such a way that it can be moved. Two additional hinge pins 13 are fastened to a middle piece 14 and extend at right angles to the hinge pins 13. These hinge pins 13 also extend through the gimbal ring 11 which can be moved along pins 13. The middle piece 14 is supported by a pivot pin 31 of the inner part 1, can be rotated about pivot pin 31 and moved along this pivot pin. The pivot pin 31 surrounds the longitudinal axis 17.

The middle piece 14 has an arm 15 which extends outside the longitudinal axis 17.. Two coil springs 16 are placed between this arm 15 and the inner part 1 respectively on each side; these coil springs 16 can be interchanged via inserts 32 and 33 on the inner part 1 and/or on the casing 2.

No relative movements between the inner part 1 and casing 2 in axes X and Y and rotary movements about these axes, are transmitted to the middle piece 14 due to the gimbal ring 11 which can be moved relative to hinge pins 12 and 13. However, rotary movements dz about axis Z are transmitted, which results in a rotary movement of arm 15 about axis 17 which is sensed by a sensor located on inner part 1.

I claim:

1. A programming device for detecting movements of a movable apparatus having an inner part which is rigidly connected to a part of the movable apparatus whose movements are to be programmed, a casing surrounding the inner part, coil springs disposed between the inner part and the casing, the springs enabling relative movements between inner part and the casing corresponding to directions to be programmed, sensors for measuring the relative movements and converting them into electrical signals, a sliding carriage connected to the casing, the sliding carriage being mounted on the inner part in such manner that it can be linearly moved in an axial direction at right angles to the longitudinal axis, one of said coil springs which can be compressed in the axial direction of the inner part being located on each side of the sliding carriage between the casing and inner part, whereby relative movement between the sliding carriage and inner part can be measured.

2. A programming device as defined in claim 1, further comprising two pins which extend coaxially in said axial direction and extend toward the longitudinal axis disposed on the casing, the sliding carriage being held between the ends of said pins in such a way so as to be free from play.

3. A programming device as defined claim 2, in which the sliding carriage has a ball held between the ends of the pins.

4. A programming device as defined in claim 2, further comprising a spring located between a carriage seat and the sliding carriage for pushing the sliding carriage in the direction of the end of a pin.

5. A programming device as defined in claim 2, in which the coil springs are disposed about the pins and are held, on one hand, on legs of a carriage seat and, on the other hand, on inserts which are removable from the casing.

6. A programming device as defined in one of the claims 1 to 5, further comprising two first sliding carriages, which can be moved linearly in the one axial direction, and two second sliding carriages, which can be moved linearly in the other axial direction, with coil springs corresponding to the former coil springs provided and set at a distance from one another along the longitudinal axis whereby programming in two axial directions extending orthogonally to one another and orthogonally to the longitudinal axis and programming of rotary movements about this axial direction is facilitated.

7. A programming device as defined in claim 6, further comprising a third sliding carriage connected to the casing, the third sliding carriage being mounted on the inner part in a manner such that is can move in the direction of the longitudinal axis, the casing having a fork which points in the direction of the longitudinal axis and which surrounds a ball of the third sliding carriage, and means for measuring relative motion between the third sliding car and the inner part, facilitating programming in direction extending along the longitudinal axis.

8. A programming device as defined in one of the claims 1 to 5, further comprising a universal joint located between the casing and the inner part, the universal joint having degrees of freedom in axial directions which are at right angles to one another and at right angles to the longitudinal axis and degrees of freedom in directions of rotation about these axial directions, for facilitating programming of rotary movement about said longitudinal axis.

9. A programming device as defined in claim 8, in which the universal joint has a ring surrounding the longitudinal axis, the ring being fixed by two diametrically opposite first hinge pins extending inwardly of the casing, a middle piece fixed by the ring, the middle piece being pivoted about the longitudinal axis via two second hinge pins which extend at right angles to the first hinge pins, the ring being movable relative to the hinge pins and means for measuring the rotary motion of the middle piece relative to the middle part.

10. A programming device as defined in claim 9, further comprising two coil springs located between an arm of the middle piece and the inner part, the arm extending away from the longitudinal axis.

11. A programming device as defined in one of claims 3 to 5, in which the ball is located between two parallel plane surfaces on the pin ends.

12. A programming device as defined in claim 1, in which the casing has a square cross-section.

13. A programming device as defined in claim 7, in which the balls are situated on the longitudinal axis when the casing is in a normal position relative to the inner part.

* * * * *